(12) United States Patent
Chen

(10) Patent No.: US 11,650,477 B2
(45) Date of Patent: May 16, 2023

(54) OPTICAL WAVEGUIDE TERMINATORS WITH DOPED WAVEGUIDES

(71) Applicant: Acacia Communications, Inc., Maynard, MA (US)

(72) Inventor: Long Chen, Marlboro, NJ (US)

(73) Assignee: ACACIA COMMUNICATIONS, INC., Maynard, MA (US)

( * ) Notice: Subject to any disclaimer, the term of this patent is extended or adjusted under 35 U.S.C. 154(b) by 0 days.

(21) Appl. No.: 15/386,879

(22) Filed: Dec. 21, 2016

(65) Prior Publication Data

US 2017/0139305 A1    May 18, 2017

Related U.S. Application Data

(63) Continuation of application No. 14/103,666, filed on Dec. 11, 2013, now abandoned.

(60) Provisional application No. 61/735,710, filed on Dec. 11, 2012.

(51) Int. Cl.
*G02B 6/24* (2006.01)
*G02F 1/225* (2006.01)
*G02B 6/122* (2006.01)
*G02F 1/21* (2006.01)

(52) U.S. Cl.
CPC .......... *G02F 1/2257* (2013.01); *G02B 6/243* (2013.01); *G02B 6/122* (2013.01); *G02F 1/212* (2021.01); *G02F 2201/08* (2013.01)

(58) Field of Classification Search
CPC .............................. G02B 6/243; G02F 1/2257

USPC ............................................................. 385/3
See application file for complete search history.

(56) References Cited

U.S. PATENT DOCUMENTS

| | | | | | |
|---|---|---|---|---|---|
| 4,087,159 | A | * | 5/1978 | Ulrich | G02B 6/06 385/115 |
| 4,592,043 | A | * | 5/1986 | Williams | H04B 10/67 385/18 |
| 4,637,025 | A | * | 1/1987 | Snitzer | G01C 19/721 372/1 |
| 5,106,193 | A | * | 4/1992 | Fesler | G01C 19/64 356/460 |
| 5,108,183 | A | * | 4/1992 | Fling | G01P 3/36 356/460 |
| 5,177,562 | A | * | 1/1993 | Wysocki | G01C 19/721 356/460 |
| 5,263,103 | A | * | 11/1993 | Kosinski | G02B 6/243 385/139 |
| 5,268,973 | A | * | 12/1993 | Jenevein | H04B 10/801 385/130 |
| 5,453,836 | A | * | 9/1995 | Kim | G01C 19/72 356/460 |
| 5,497,265 | A | * | 3/1996 | Fontana | H01S 3/067 359/341.3 |
| 5,619,610 | A | * | 4/1997 | King | G02B 6/3818 385/139 |
| 5,784,505 | A | * | 7/1998 | Schunk | G02F 1/3137 385/17 |

(Continued)

*Primary Examiner* — Kaveh C Kianni

(74) *Attorney, Agent, or Firm* — K&L Gates LLP

(57) ABSTRACT

Disclosed herein are methods, structures, apparatus and devices for the termination of unused waveguide ports in planar photonic integrated circuits with doped waveguides such that free-carrier absorption therein may advantageously absorb any undesired optical power resulting in a significant reduction of stray light and resulting reflections.

10 Claims, 3 Drawing Sheets

(56) References Cited

U.S. PATENT DOCUMENTS

| | | | | |
|---|---|---|---|---|
| 5,867,258 | A * | 2/1999 | Frederick | G01H 9/004 250/227.27 |
| 5,920,666 | A * | 7/1999 | Digonnet | G02F 1/3517 372/6 |
| 6,144,788 | A * | 11/2000 | Ang | G01C 19/721 356/477 |
| 6,192,712 | B1 * | 2/2001 | Saito | C03B 19/1415 65/386 |
| 6,542,671 | B1 * | 4/2003 | Ma | G02B 6/12002 385/132 |
| 8,805,130 | B2 * | 8/2014 | Lipson | G02B 6/12007 385/132 |
| 2001/0046353 | A1 * | 11/2001 | Seki | G02B 6/13 385/50 |
| 2002/0150331 | A1 * | 10/2002 | Tomlinson | G02B 6/12004 385/27 |
| 2003/0032286 | A1 * | 2/2003 | Deliwala | G02F 1/025 438/689 |
| 2003/0055342 | A1 * | 3/2003 | Toida | A61B 3/102 600/478 |
| 2003/0063848 | A1 * | 4/2003 | Burns | H01S 3/06795 385/27 |
| 2003/0068131 | A1 * | 4/2003 | Gunn, III | B82Y 20/00 385/40 |
| 2003/0142943 | A1 * | 7/2003 | Yegnanarayanan | G02F 1/025 385/131 |
| 2003/0156605 | A1 * | 8/2003 | Richardson | H01S 3/06791 372/25 |
| 2004/0013339 | A1 * | 1/2004 | Arakawa | G02B 6/122 385/14 |
| 2004/0086213 | A1 * | 5/2004 | Ramachandran | G02B 6/02071 385/11 |
| 2004/0223768 | A1 * | 11/2004 | Shastri | G02F 1/0121 398/183 |
| 2004/0258341 | A1 * | 12/2004 | Paolucci | G02B 6/024 385/4 |
| 2006/0171426 | A1 * | 8/2006 | Starodoumov | H01S 3/0675 372/6 |
| 2010/0073762 | A1 * | 3/2010 | Onaka | H01S 3/302 359/334 |
| 2011/0122895 | A1 * | 5/2011 | Savage-Leuchs | H01S 3/06716 372/10 |
| 2011/0292951 | A1 * | 12/2011 | Qiu | G01C 19/721 372/6 |
| 2011/0306956 | A1 * | 12/2011 | Islam | A61B 18/20 606/15 |
| 2012/0033688 | A1 * | 2/2012 | Liaw | H01S 3/08036 372/20 |
| 2013/0014577 | A1 * | 1/2013 | Tam | G01P 5/10 73/204.11 |
| 2013/0064491 | A1 * | 3/2013 | Fujikata | G02F 1/025 385/2 |
| 2013/0182620 | A1 * | 7/2013 | Chaffee | H04B 10/11 370/310 |
| 2014/0050234 | A1 * | 2/2014 | Ter-Mikirtychev | H01S 3/10007 372/6 |
| 2014/0105544 | A1 * | 4/2014 | Ushida | G02B 6/12 385/77 |
| 2015/0016767 | A1 * | 1/2015 | Akiyama | H01S 5/142 385/3 |

* cited by examiner

OPTICAL WAVEGUIDE TERMINATORS WITH DOPED WAVEGUIDES

RELATED APPLICATIONS

This Application is a continuation claiming the benefit under 35 U.S.C. § 120 of U.S. patent application Ser. No. 14/103,666, filed on Dec. 11, 2013, entitled "OPTICAL WAVEGUIDE TERMINATORS WITH DOPED WAVEGUIDES," which is hereby incorporated herein by reference in its entirety. U.S. patent application Ser. No. 14/103,666 claims the benefit of U.S. Provisional Patent Application Ser. No. 61/735,710 filed Dec. 11, 2012 which is incorporated by reference in its entirety as if set forth at length herein.

TECHNICAL FIELD

This disclosure relates generally optical communications and planar photonic integrated circuits. More particularly, this disclosure pertains to techniques, methods, apparatus, structures and materials pertaining to the termination of unused waveguide ports in planar photonic integrated circuits with doped waveguides.

BACKGROUND

Contemporary optical communications and other photonic systems make extensive use of photonic integrated circuits. Accordingly, techniques, methods, apparatus and structures that improve operational characteristic of such photonic circuits would represent a welcome addition to the art.

SUMMARY

An advance in the art is made according to an aspect of the present disclosure directed to techniques, methods, apparatus, structures and materials that enhance the operational characteristics of planar photonic integrated circuits by terminating unused waveguide ports with doped waveguides.

Advantageously compared to other waveguide termination techniques known in the art, doped waveguide termination of unused ports according to the present disclosure significantly reduces stray light and reflections in the photonic circuits.

BRIEF DESCRIPTION OF THE DRAWING

A more complete understanding of the present disclosure may be realized by reference to the accompanying drawings in which.

DETAILED DESCRIPTION

Figure 1A:
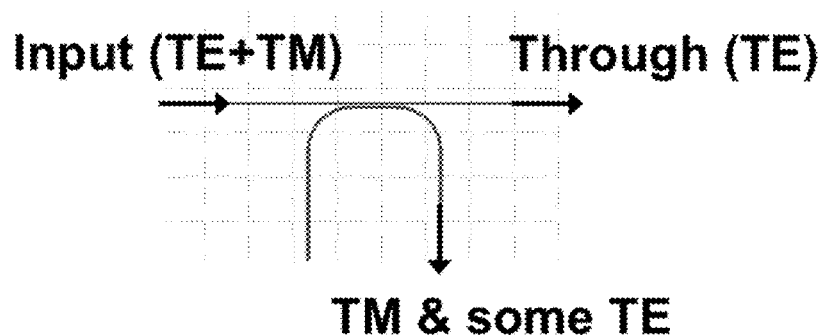
FIGS. 1A and 1B show schematic illustrations of optical components that may generate reflections/stray light including (a) a polarization filter including a directional coupler when TM port is not property terminated, and (b) a Mach-Zehnder interferometer employed as an optical modulator in which ~50% of average optical power becomes stray light during modulation.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin my noting that it is known for the operation of microwave circuits, unused microwave ports may be terminated thereby avoiding undesirable back reflections. Generally—and according to the present disclosure—a similar concept is now applied to photonic circuits.

Compounding the problem however, is the fact that in addition to any optical reflections, stray light in photonic circuits is also problematic. More particularly, unlike free space configurations in which stray-light diffracts away rapidly, stray light often remains in photonic integrated circuits because vertical stacks of materials provide optical confinement.

As those skilled in the art will appreciate when different functional photonic elements are closely integrated together into one or more photonic integrated circuits—and different optical power levels are involved—high optical isolation is required and stray light should be minimized throughout the circuits.

For example, an integrated circuit including a transmitter and a receiver might have a laser input approaching 15 dBm, and a receiver part to measure another signal with a power level of −35 dBm (for example, an optical power monitor with 5% tap of the received signal). In this example, an optical isolation of more than 50 dB is thus required.

Figure 1B:

Unfortunately, many optical components generate reflections and/or stray light. With reference now to FIGS. 1A and 1B, there is shown two such examples. FIG. 1A shows a schematic example of a polarization filter based on a directional coupler. As depicted therein, most of the transverse electric (TE) signal continues along a through port. All of the undesired orthogonal transverse magnetic (TM) light and some of the TE signal are shown as being filtered out to another port. As may be appreciated—with such a configuration—some of light traversing the structure will be reflected back, and some will become stay light.

FIG. 1B shows in schematic form an illustration of an exemplary Mach-Zehnder interferometer (MZI). As is known in the art, such (MZIs) are oftentimes used in optical modulators. Here one or both arms of the MZI are adjusted, and an optical signal at an output port is modulated. For a non-return-to-zero on-off-keying modulation (NRZ-OOK), in average only 50% of the optical power is delivered to the output port, and the remaining 50% becomes stray light in the circuit.

Figure 3:
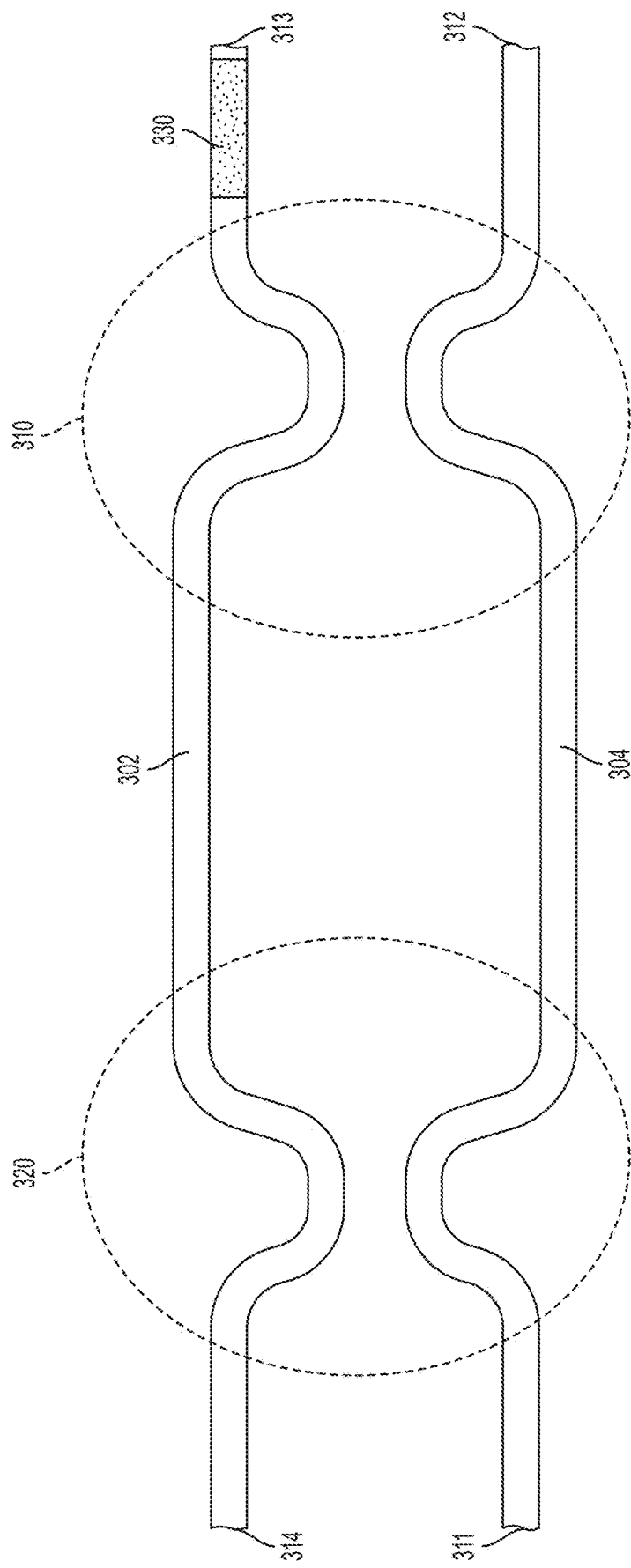
FIG. 3 shows a schematic illustration of an optical interferometer having 2×2 optical combiners, according to a non-limiting embodiment.

According to an aspect of the present disclosure, such infirmity may advantageously be avoided if a 2×2 optical combiner replaces the 2×1 optical combiner and the unused port of the 2×2 combiner is properly terminated according to the present disclosure. FIG. 3 illustrates an optical interferometer in which the 2×1 optical combiners have been replaced with 2×2 optical combiners, and the unused port of a 2×2 optical combiner is terminated. The optical interferometer includes four ports, 2×2 optical combiner 310 and 2×2 optical combiner 320. The first port 311 and the second port 312 are coupled to the interferometer's first waveguide arm 302. The third port 313 and the fourth port 314 are coupled to the interferometer's second waveguide arm 304. The third port 313 is terminated using a doped waveguide (330).

There exist several techniques for terminating unused waveguide ports. However these techniques principally reduce optical reflections. Accordingly, most of the undesired light is still converted to stray light, which is problematic for photonic integrated circuits.

For example, one technique uses relatively long waveguides to terminate the unused ports. As light propagates along the waveguides, it gradually diminishes due to the propagation loss of the waveguides. However, in many cases the propagation loss is predominately optical scattering loss, which converts the optical signal mostly to stray light. Another technique uses a waveguide inverse taper with reducing waveguide width. Here the optical mode gradually loses confinement and light is diffracted into the claddings surrounding the waveguide, again becoming stray light. Yet another technique routes the unused ports to the edges of the photonic chip and the undesired light is sent off the chip. However, such routing might become difficult in many circuits having a high level of integration and therefore a large number of "internal" circuits.

According to an aspect of the present disclosure, intentionally doped waveguides are used to terminate any unused waveguide ports in a photonic integrated circuit—or other photonic structure—such that undesired light is absorbed by the free carrier absorption without causing additional reflections or stray light, as was the case with prior art existing techniques. In a preferred embodiment, any undesired light is completely absorbed by the free carrier absorption and additional reflections and stray light is eliminated. In certain embodiments, unused ports are added to a photonic structure and then terminated according to the present disclosure such that reflections and stray light are reduced or eliminated, and the structure's overall performance is enhanced.

As used herein, an unused waveguide port in a photonic integrated circuit is one that is either unused, or open-ended, and the doped waveguides that form the terminators are intentionally doped.

Figure 2:
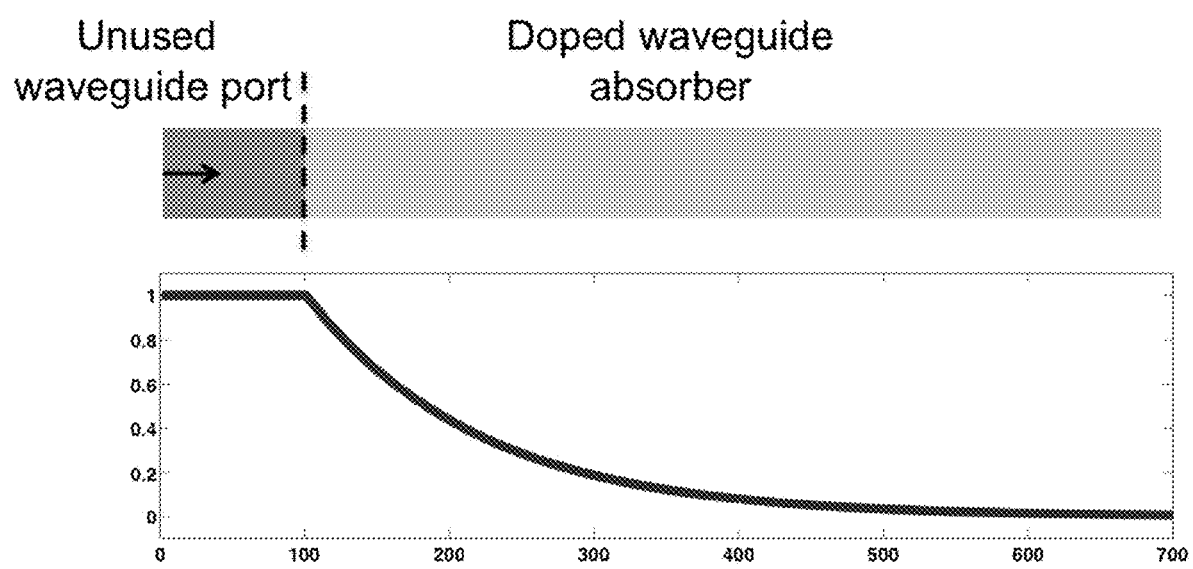
FIG. 2 shows a schematic illustration of using a doped waveguide to terminate unused waveguide port(s) wherein the free-carrier absorption in the doped waveguide gradually reduces the optical power level without causing reflection or stray light according to the present disclosure.

These concepts of the present disclosure are illustrated schematically in FIG. 2. Therein an unused waveguide port is connected to a waveguide that has been intentionally doped. This doping adds free carriers such as electrons or holes to the waveguide, which induces optical absorption through free-carrier absorptions. As light propagates along the doped waveguide, the power level exponentially drops and can be suppressed to a sufficiently low level with enough propagation length.

Advantageously, because the suppression mechanism according to the present disclosure is based on absorption rather than scattering, no significant stray light will be generated. Also, unless the doping level in the absorber region is extremely high, the difference in refractive indices between the undoped region and the doped region is small enough to avoid significant optical reflection at the interface.

We may now provide a further example of a device and/or structure according to the present disclosure. Here we give an example as based on a silicon photonic integrated circuit. In doped silicon, the changes in the refractive index and the absorption coefficient can be written as $$\Delta n = -8.8 \times 10^{-22} \Delta N - 8.5 \times 10^{-18} (\Delta P)^{0.8},$$

$$\Delta \alpha = 8.5 \times 10^{-18} \Delta N + 6.0 \times 10^{-18} \Delta P.$$

respectively, where N and P are the concentrations of free electrons and holes, in $cm^{-3}$. For example, if an n-doped region with an electron concentration of 1E19 is used as the waveguide terminator, assuming a confinement factor of close to 1, the absorption coefficient is 85 $cm^{-1}$ or about 370 dB/cm. So an absorber with 1.5 mm length is sufficient to produce an attenuation of more than 55 dB. The change in the refractive index is about −8.8E-3, which corresponds to a reflection level of only −58 dB, negligible for most applications. For an even higher doping level of 1E20, the absorption coefficient becomes 3700 dB/cm (an absorber length of merely 150 micrometers produces an attenuation of more than 55 dB), and the reflection level increases to −38 dB, which might still be acceptable for many applications.

At this point, those skilled in the art will readily appreciate that while the methods, techniques and structures according to the present disclosure have been described with respect to particular implementations and/or embodiments, those skilled in the art will recognize that the disclosure is not so limited. For example, the termination waveguide may be partially doped and partially undoped, or doped to different types or levels in different segments. Additional transition pieces such as waveguide width tapers or transitions between waveguides of different thickness/etch depths may be added between the unused waveguide port and the doped waveguide absorber. The doped waveguide can be routed in a straight pattern, or in spiral patterns to reduce its footprint. The end of the doped waveguide absorber can be either an abrupt end or a gradual taper, without affecting the device performance. Accordingly, the scope of the disclosure should only be limited by the claims appended hereto.

The invention claimed is:

1. A photonic integrated circuit comprising: a Mach-Zehnder optical interferometer having: a first waveguide arm and a second waveguide arm, the first waveguide arm having a first port and a second port at opposite ends of the first waveguide arm, and the second waveguide arm having a third port and a fourth port at opposite ends of the second waveguide arm; wherein the third port is an unused waveguide port, wherein a portion of the third port is doped with a dopant configured to induce optical absorption and optically terminate the third port.

2. The photonic integrated circuit of claim 1, wherein the Mach-Zehnder optical interferometer further comprises a first 2×2 optical coupler between the third port and the fourth port.

3. The photonic integrated circuit of claim 2, wherein the first 2×2 optical coupler is also between the first port and the second port.

4. The photonic integrated circuit of claim 1, wherein the Mach-Zehnder optical interferometer is configured to be operated as a modulator.

5. The photonic integrated circuit of claim 2, wherein the Mach-Zehnder optical interferometer further comprises a second 2×2 optical coupler between the third port and the fourth port.

6. The photonic integrated circuit of claim 1, wherein the Mach-Zehnder optical interferometer is disposed on a silicon substrate.

7. The photonic integrated circuit of claim 1, wherein the portion of the third port is p-doped.

8. The photonic integrated circuit of claim 1, wherein the portion of the third port is n-doped.

9. The photonic integrated circuit of claim 1, wherein the portion of the third port comprises an electron concentration of $10^{20}$ cm$^{-3}$.

10. The photonic integrated circuit of claim 1, wherein the dopant is configured to optically terminate the third port through free-carrier absorption.

* * * * *